3,647,881
NOVEL AROYL PHENETHYL ALCOHOLS
David Edmund Bays and Roy Vivian Foster, London, England, assignors to Allen & Hanburys Limited, London, England
No Drawing. Filed Jan. 13, 1970, Ser. No. 2,665
Claims priority, application Great Britain, Jan. 13, 1969, 1,902/69
Int. Cl. C07c 49/82
U.S. Cl. 260—591          17 Claims

ABSTRACT OF THE DISCLOSURE

Phenethyl alcohol derivatives of the formula

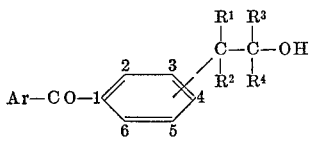

in which $R^1$, $R^2$, $R^3$ and $R^4$ which may be the same or different, each represent a hydrogen atom or a straight or branched alkyl radical containing from 1 to 4 carbon atoms; Ar represents a phenyl ring, which may be substituted by one or more trifluoromethyl, hydroxy, methoxy or methyl radicals or by one or more halogen atoms are provided. These possess useful anti-inflammatory activity.

---

This invention relates to novel phenethylalcohol derivatives which possess anti-inflammatory activity. It also relates to methods for the production of such compounds and to pharmaceutical compositions containing the same.

The present invention provides phenethylalcohol derivatives of general Formula I in which $R^1$, $R^2$, $R^3$ and $R^4$, which may be the same or different, each represent a

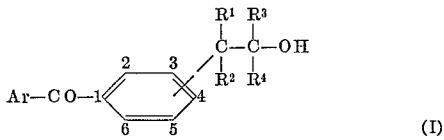

atom or a straight or branched chain alkyl radical containing 1–4 carbon atoms.

Ar represents a phenyl ring, optionally substituted by one or more trifluoromethyl, hydroxy, methoxy or methyl radicals, or by one or more halogen atoms.

The invention includes all optically active forms and racemic mixtures of those compounds which possess an asymmetric carbon atom, i.e. compounds in which $R^1$ differs from $R^2$ and/or $R^3$ differs from $R^4$.

We have found that these compounds possess useful anti-inflammatory activity, for example 4-(2-hydroxyethyl)-benzophenone has been shown to inhibit the writhing produced in mice by the intraperitoneal injection of phenylquinone and suppressed inflammation produced in the paw of rats by injection of carrageenin.

The compounds may be formulated for use in human and veterinary medicine for therapeutic purposes. The invention, therefore, includes within its scope pharmaceutical compositions comprising as active ingredients one or more compounds of the general Formula I. Such compositions may be presented for use in a conventional manner with the aid of carriers or excipients and formulatory agents as required, and with or without supplementary medical agents. These compositions include for instance solid or liquid preparations for oral use, suppositories and injections. Oral administration is most convenient in the form of tablets which may be prepared according to conventional methods and may be coated if desired. Injections may be formulated with the aid of physiologically acceptable carriers and agents as solutions, suspensions or as dry products for reconstitution before use.

Suitably, when the composition is presented in unit dosage form, e.g. as a tablet, each unit can contain from 25 to 500 mg. of active ingredient.

The compounds according to the invention may be prepared in a number of ways which are described below with reference to formulae and reaction schemes in which the symbols Ar, $R^1$, $R^2$, $R^3$ and $R^4$ have the above stated meanings.

The phenethylalcohol derivatives of general Formula I, in which the ArCO group is in the position para to the side chain may be prepared by reaction of a compound of Formula III (wherein Z is a halogen atom) with an aroyl chloride in the presence of, for example, aluminium chloride and in solution in a suitable solvent, e.g. methylene chloride or ethylene dichloride to give aroylphenethylhalides as in Formula IV.

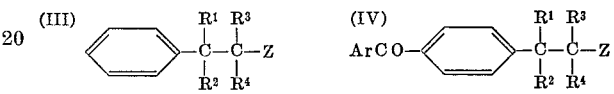

The compounds of Formula IV are then converted to the alcohols of Formula I for example by reaction with potassium acetate in acetic acid and hydrolysis of the acetates of the alcohols (I) so formed with aqueous alcoholic alkali.

The phenethyl alcohols of general Formula I in which the aroyl group is in the meta or para positions relative to the hydroxy alkyl side chain may also be prepared using the appropriate bromobenzophenone V as starting material. The carbonyl group is protected, for example by ketal formation via the dichloride and subsequent reaction with an alkali metal alkoxide as the dialkyl ketal VI and the latter is treated with an alkyllithium or alkylmagnesiumhalide in a solvent, e.g. tetrahydrofuran, to give solutions of organometallic derivatives, e.g. (VII).

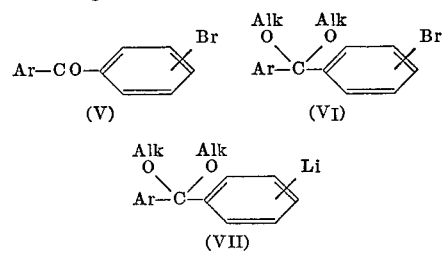

Addition of an epoxide of general Formula VIII gives the alcohols of Formula IX. The ketal group is removed by hydrolysis to give the alcohols of Formula I.

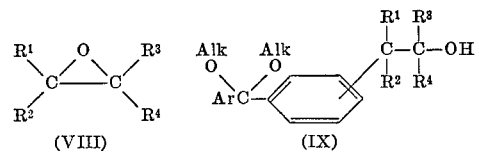

In a further process for the production of phenethylalcohols of general Formula I a compound of Formula X is used as starting material.

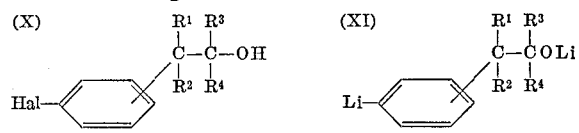

This is converted into the dilithio compound (XI), e.g. by treatment with lithium metal or an alkyl lithium in a solvent, e.g. diethyl ether or tetrahydrofuran. The product reacts with a nitrile of formula ArCN to give an intermediate imine which is hydrolysed in warm aqueous acid to an alcohol of Formula I.

A further process for the production of phenethylalcohols of general Formula I in which R³ and R⁴ represent hydrogen involves the reduction of the ketals of esters of Formula XII, for example with lithium aluminium hydride, followed by hydrolysis of the ketal group.

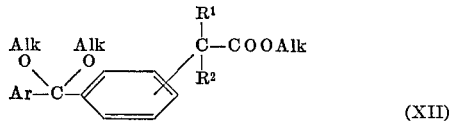

(XII)

The preparation of phenethylalcohols of general Formula I in which R³=R⁴ is also achieved by reacting the ketal (XII) with an organometallic derivative, e.g. an alkyl magnesium halide or alkyl lithium followed by hydrolysis.

The following examples illustrate the invention.

EXAMPLE 1

4-(2-hydroxyethyl)-benzophenone was prepared as follows: Aluminium chloride (15.0 g.) and benzoyl chloride (29.0 g.) in ethylene chloride (150 ml.) were added to phenethyl bromide (20.0 g.) in ethylene chloride (150 ml.) and heated under reflux with stirring for 30 minutes. The mixture was poured onto ice and hydrochloric acid and the product which was an oil was isolated from the washed and dried organic layer by fractional distillation. Yield 15.1 g., B.P. 156–158° (0.1 torr). The oil solidified and was crystallised from aqueous ethanol to give the product, M.P. 50°.

4-(2-bromoethyl)benzophenone (9.2 g.) and potassium acetate (5.0 g.) were heated under reflux in acetic acid (50 ml.) for 50 hours. The product was isolated by dilution with water and extraction with ether and purified by chromatography on silica. Elution with cyclohexane-ethyl acetate gave the acetate (1.7 g.).

4-(2-hydroxyethyl)-benzophenone acetate (1.7 g.) in ethanol (50 ml.) was treated for 2 hours at room temperature with potassium hydroxide (2.0 g.) in water (10 ml.). The ethanol was removed and the product was isolated by dilution with water and extraction with ether. Recrystallisation from benzene-light petroleum (B.P. 60–80°) gave colourless crystals, M.P. 63.3°.

EXAMPLE 2

In an alternative process 4-(2-hydroxyethyl)benzophenone was prepared as follows: 4-benzoylphenyl acetic acid, methyl ester (6.0 g.) and triethylorthoformate (5.6 g.) were dissolved in ethanol (50 ml.) and treated with ethanolic hydrogen chloride (0.5 ml. of 5% solution). The solution was left to stand at room temperature for 72 hours, then the acid was neutralised with a solution of sodium methoxide. After filtration and evaporation, the residue was distilled to give the ketal as a colourless oil (6.4 g.), B.P. 151–153°/0.3 mm.

The diethyl ketal of the ester (6.0 g.) in anhydrous tetrahydrofuran (50 ml.) was added dropwise to a stirred suspension of lithium aluminium hydride (0.7 g.) in anhydrous tetrahydrofuran (50 ml.) at 0° C. The mixture was allowed to warm to room temperature, then heated under reflux for one hour. After cooling, ethyl acetate (5 ml.) followed by 50% aqueous tetrahydrofuran (10 ml.) was added, and the mixture filtered. Evaporation of the solvents, followed by distillation under vacuum, gave the diethyl ketal of the alcohol as a colourless oil (5.0 g.), B.P. 160–161°/0.5 mm.

The diethyl ketal of the alcohol (5.0 g.) was heated under reflux with 2 N hydrochloric acid (200 ml.) for 2 hours. The solution was cooled, diluted with water (100 ml.) and extracted with ether. The ethereal extract was washed with water, dried (MgSO₄) and evaporated to give an oil (3.2 g.) that crystallised. Recrystallisation from benzene/light petroleum (B.P. 60–80°) gave the alcohol as colourless needles (2.5 g.), M.P. 63.4°.

EXAMPLE 3

Benzoyl chloride (1.125 k.), 2-phenethylbromide (1 k.) and aluminium chloride (750 g.) in nitrobenzene (5 l.) were stirred at 40–45° for 24 hours and then poured onto ice (10 kg.). The organic layer was separated and evaporated under reduced pressure and the residue was extracted with hot light petroleum. The petroleum solutions on cooling yielded 4-benzoylphenethyl bromide which was recrystallised from iopropanol, M.P. 52–53°. The bromide (8.7 g.) and silver acetate (5 g.) in acetic acid (90 ml.) were refluxed for 24 hours, cooled and filtered and acetic acid was distilled from the filtrate. The residue was dissolved in ethanol (50 ml.), aqueous sodium hydroxide (25 ml.) was added and the mixture was kept 2 hours and evaporated. Water (50 ml.) and benzene (50 ml.) were added and the benzene solution was separated, washed with water, dried and evaporated to give 4-(2-hydroxyethyl)benzophenone which was crystallised from benzene/light petroleum, M.P. 64–65°.

EXAMPLE 4

4-bromobenzophenone (100 g.) and phosphorus pentachloride (80 g.) in dry benzene (400 ml.) were boiled under reflux 24 hours. Benzene and phosphorus oxychloride were distilled off and the residue was distilled under reduced pressure to gipe 4-bromo-α,α-dichloro diphenylmethane B.P. 138–140°/0.2 mm. This material (74 g.) was added during 1 hour to sodium methoxide (from sodium (11 g.) and methanol (500 ml.)). Sodium chloride was filtered off and methanol distilled from the filtrate to yield an oil which was dissolved in ether. The ether solution was washed with water, dried and evaporated to yield an oil that solidified. The solid was recrystallised from methanol to give 4-bromo-α,α-dimethoxydiphenyl methane, M.P. 45.5–47.5°.

This compound (5 g.) in ether (25 ml.) was added to butyl lithium (from n-butyl bromide (2.8 g.) and lithium (0.3 g.) in dry ether (50 ml.) cooled to −35°). The mixture was warmed to −10° during 1.5 hours and was treated with buten-1,2-oxide (3.4 g.) in ether (15 ml.), kept at −10° for 1.5 hours, and then allowed to warm to room temperature overnight. The mixture was filtered, washed with water, dried, and evaporated to a yellow oil which was refluxed 1 hour in ethanol (50 ml.) containing hydrochloric acid (25 ml., 2 N). Water was added, ethanol distilled off, and the mixture extracted with ether. The ether solution was washed with aqueous sodium carbonate, dried, and evaporated to give an oil. This was purified by chromatography on alumina and distillation to afford pure 4-(2-hydroxybutyl)benzophenone, B.P. 189–192°/0.3 mm.

4-(2-hydroxypropyl)benzophenone, B.P. 170–172°/0.3 mm. was prepared similarly.

EXAMPLE 5

3-bromobenzophenone (20 g.) and phosphorus pentachloride (16 g.) in dry benzene (80 ml.) were boiled under reflux 41 hours. Benzene and phosphorus oxychloride were distilled off and 3-bromo-α,α-dichlorodiphenylmethane was obtained from the residue by distillation under reduced pressure, B.P. 159–161°/2 mm. This material (15 g.) was added to sodium methoxide (from sodium (2.2 g.)) in methanol (100 ml.) and the mixture boiled 1 hour under reflux. Methanol was removed and the residue was extracted with ether. The ether solution was washed with water, dried and evaporated to yield an oil which crystallised from methanol to give 3-bromo-α,α-dimethoxydiphenylmethane, M.P. 45–48°. This compound (5 g.) was added to butyl lithium (from n-butyl bromide (2.8 g.) and lithium (0.3 g.)) in dry ether (50 ml.) stirred at −55° for 50 minutes when propylene oxide (3 g.) in ether (15 ml.) was added. The mixture was allowed to warm to room temperature during 1.5 hours filtered, washed with water, dried, and evaporated. The residual oil in ethanol (50 ml.) and hydrochloric acid (25 ml., 2 N)

was heated on a steam bath 1 hour. Water (50 ml.) was added and methanol removed by distillation. The aqueous mixture was cooled and extracted with ether and the ether solution was washed with aqueous sodium carbonate and water; dried and evaporated. Chromatography of the residue on alumina afforded 3-(2-hydroxypropyl)benzophenone which was distilled under reduced pressure, B.P. 161–164°/0.3 mm.

EXAMPLE 6

4-bromophenethanol (5 g.) was added to butyl lithium (from lithium) (0.7 g.) and butylbromide (6.8 g.) in dry ether (50 ml.) cooled to −30°. The mixture was warmed to 0°, stirred 1 hour, treated with 4-methoxy benzonitrile (3.3 g.) in ether (30 ml.) added over 10 minutes, and kept overnight. Water (500 ml.) was added and the ether layer was separated, dried and evaporated to give an oil. This was dissolved in hydrochloric acid (90 ml., 2 N) and the solution warmed 1 hour. The oil that separated was extracted into ether. The ether solution was washed with water, dried and evaporated to give a residue of $4^1$-methoxy-4-(2-hydroxyethyl) benzophenone which was crystallised from benzene/light petroleum (B.P. 60–80°), M.P. 90–91°.

Also prepared similarly were:

4-(2-hydroxyethyl)benzophenone, M.P. 64–65°;
$4^1$-chloro-4-(2-hydroxyethyl)benzophenone, M.P. 82–84°;
$2^1$-chloro-4(2-hydroxyethyl)benzophenone, B.P. 232–236°/0.1 mm;
$2^1$-methyl-4-(2-hydroxyethyl)benzophenone, B.P. 212–218°/1.1 mm;
$4^1$-methyl-4(2-hydroxyethyl)benzophenone, M.P. 92–93°;
$3^1$-methoxy-4(2-hydroxyethyl)benzophenone, B.P. 240–250°/0.5 mm;
$4^1$-fluoro-4(2-hydroxyethyl)benzophenone, M.P. 62–63°.

EXAMPLE 7 n-butyl lithium (from n-butyl bromide) (11.6 g.) and lithium (1.2 g.) in ether (50 ml.) was added to m-dibromobenzene (15 g.) in ether (50 ml.) at −30°. After 1 hour ethylene oxide (9 g.) in chilled ether (20 ml.) was added and the mixture stood for 1 hour. Water (100 ml.) was added and the ether solution was separated, dried, and evaporated to give 3-bromophenethanol which was distilled under reduced pressure, B.P. 100–110°/1.2 mm.

This material (4.5 g.) in ether (50 ml.) was added during 15 minutes to butyl lithium (from butyl bromide (7.4 g.) and lithium (0.75 g.) in ether (100 ml.)) at −35°. The mixture warmed to 0° and was stirred 1 hour at this temperature when p-chloro-benzonitrile (3.1 g.) in ether (50 ml.) was added over 15 minutes. After 3 hours the reaction mixture was extracted with hydrochloric acid (300 ml., 2 N) and the extract heated 1 hour on a steam bath. The oil that separated was extracted with ether and the ether solution was washed with water, dried and evaporated to give $4^1$-chloro-3 (2-hydroxyethyl)benzophenone which was crystallised from benzene/light petroleum (B.P. 60–80°), M.P. 71–73°.

Also prepared similarly were:

$2^1$-methyl-3(2-hydroxyethyl)benzophenone, B.P. 205°/2 mm.;
$4^1$-methyl-3(2-hydroxyethyl)benzophenone, M.P. 60–62°.

EXAMPLE 8

1,4-dibromobenzene (93.6 g.) in dry ether (500 ml.) was added during 90 minutes to magnesium (10.5 g.) in dry ether (60 ml.). The mixture was refluxed 1 hour and then cooled during the addition over 1 hour of propylene oxide (31.5 g.) in tetrahydrofuran (100 ml.). Saturated aqueous ammonium chloride (200 ml.) was added followed by hydrochloric acid (30 ml., 3 N). The organic layer was separated, washed with water, dried and evaporated to give an oil which was fractionally distilled under reduced pressure. The fraction boiling at 120–140°/1.5 mm. was redistilled and the fraction B.P. 106°/0.7 mm. was shown by gas liquid chromatography and nuclear magnetic spectroscopy to be substantially pure 1-(4-bromophenyl)-2-propanol.

1-(4-bromophenyl)-2-propanol (2.5 g.) in ether (50 ml.) was added during 15 minutes to butyl lithium (from n-butyl bromide) (5.5 g.) and lithium (0.56 g.) in ether (100 ml.) cooled to −35°. The mixture was warmed to 0° during 1 hour, o-chlorobenzonitrile (2 g.) in ether (30 ml.) was added during 15 minutes, and the mixture was stirred 18 hours at room temperature and extracted with hydrochloric acid (300 ml., 2 N). The extract was warmed 3 hours on a steam bath and the oil that separated was extracted into ether. The ether extract was washed with water, dried and evaporated and the oil obtained was purified by chromatography to give $2^1$-chloro-4 (2-hydroxypropyl)benzophenone as an oil that did not crystallise, B.P. 240–242° at 0.2 mm.

EXAMPLE 9

Methyl 4-benzoylphenyl acetate (10 g.) was added during 10 minutes to sodium hydride (4 g.) in dimethylformamide (50 g.). After 1 hour the solution was cooled to 0° and treated with methyl iodide (24.5 g.) added over 5 minutes. The mixture was stirred overnight at room temperature, diluted with water (100 ml.) and extracted with ether. The ether extract was washed with water, dried and evaporated to give methyl 4-benzoyl-α-methylhydratropate which was crystallised from petroleum ether, M.P. 50–52°. This ester (6 g.), triethyl orthoformate (6.3 g.) and hydrogen chloride (1 ml. 3% ethereal solution) in ethanol (50 ml.) was allowed to stand 72 hours at room temperature. Water (25 ml.) and aqueous sodium carbonate (25 ml., 2 N) were added and the mixture was extracted with ether. The ether extract was washed with saturated brine, and water, dried, and evaporated to give methyl 4-benzoyl - α - methylhydratropate, diethylacetal crystallised from aqueous ethanol, M.P. 67–69°. This ester (4.2 g.) in dry tetrahydrofuran (25 ml.) was added dropwise to lithium aluminium hydride in dry tetrahydrofuran and the mixture was stirred at room temperature for 1 hour and treated with water (20 ml.). The mixture was filtered and the filtrate evaporated to give an oil which was dissolved in ethanol (50 ml.) containing hydrochloric acid (25 ml., 2 N). The solution was heated 1 hour on a steam bath. Water was added and the mixture extracted with ether. The ether extract was washed with brine and with aqueous sodium carbonate, dried and evaporated to give 4-(2-hydroxy-1,1-dimethylethyl)benzophenone which was distilled under reduced pressure, B.P. 180–183°/0.2 mm.

EXAMPLE 10

Methyl 4-benzoylphenylacetate (50.8 g.), triethylorthoformate (47.4 g.) and ethanol (130 ml.) containing hydrogen chloride (0.5 g.) were stood at room temperature 120 hours. The mixture was made slightly alkaline with alcoholic sodium ethoxide and filtered. The filtrate was evaporated and the residual diethyl ketal of methyl 4-benzoylphenylacetate distilled under reduced pressure, B.P. 155–158°/0.1 mm. This material (6.6 g.) in ether (10 ml.) was added during 5 minutes to methyl magnesium iodide (from magnesium (1.2 g.) and methyl iodide (7.1 g.)) in ether (50 ml.) and the mixture was boiled under reflux 15 minutes, cooled and poured into saturated ammonium chloride. The ether layer was separated, washed with water, dried, and evaporated to give the diethyl ketal of 4-(2-hydroxy - 2,2 - dimethylethyl) benzophenone, M.P. 81–83°. This ketal (5.6 g.) was dissolved in ethanol (50 ml.), hydrochloric acid (20 ml., N) was added, and the mixture was kept at room temperature for 2 hours. Solvent was distilled off. The residue was dissolved in ether, and the ether solution was washed with water, dried and evaporated to give 4-(2-hydroxy-2,2-dimethylethyl)benzophenone which was crystallised from benzene/light petroleum, M.P. 79°.

EXAMPLE 11

To prepare 10,000 tablets each containing 100 mg. of 4-(2-hydroxyethyl)-benzophenone mix together 1,000 g. of powdered 4-(2-hydroxyethyl)-benzophenone with 750 g. of calcium sulphate dihydrate and sufficient of a 5% solution of low viscosity sodium carboxymethylcellulose to produce a damp cohesive mass. Granulate the damp mass by passing through a 16 mesh sieve. Dry the granules at 45–50° C. Pass the dried granules through a 20 mesh sieve and mix the sieved granules with 240 g. of maize starch and 10 g. of magnesium stearate.

Compress the lubricated granules on a suitable tablet machine using $^{10}\!/_{32}''$ diameter normal concave punches to produce tablets each weighing 200 mg.

EXAMPLE 12

To prepare 100,000 sugar coated tablets each containing 100 mg. 4-(2-hydroxyethyl)-benzophenone mix together 10 kg. of powdered 4 - (2 - hydroxyethyl)-benzophenone with 7.5 kg. of calcium sulphate dihydrate and sufficient of a 5% solution of low viscosity sodium carboxymethylcellulose to produce a damp cohesive mass. Granulate the damp mass by passing through a 16 mesh sieve. Dry the granules at 45–50°. Pass the dried granules through a 20 mesh sieve and mix the sieved granules with 2.4 kg. of maize starch and 100 g. of magnesium stearate.

Compress the lubricated granules on a suitable tablet machine using $^{10}\!/_{32}''$ diameter deep concave punches.

Place the tablet cores in a coating pan of suitable size. Heat the cores to 45° C. by means of hot air and apply 200 ml. of a syrup containing 12% by weight of Acacia and 66% by weight of sucrose. Allow the tablets to roll until they are evenly coated with the syrup then dry by means of heated air. Repeat this step.

Continue the sugar coating using a syrup containing 60% by weight of sucrose and 15% by weight of calcium phosphate until the tablet cores each weigh 325 mg.

Continue coating using a syrup containing 66% by weight of sucrose and a suitable colouring agent until the tablets weight 350 mg. each. Finally polish the tablets using known techniques.

EXAMPLE 13

To prepare 100,000 enteric coated tablets each containing 100 mg. 4-(2-hydroxyethyl)-benzophenone.

Prepare the tablet cores as described in Example 12.

Rotate the tablet cores in a suitable coating pan and apply 200 ml. of a solution containing 10% by weight of polyvinylpyrrolidione 2% by weight of polyethylene glycol 6000 in 66 o.p. industrial alcohol. Dry off the solvents with cold air and repeat the operation. Apply in a similar manner a film of cellulose acetate phthalate sufficient to enable the tablets of conform to the disintegration test for enteric coated tablets of the British Pharmacopoeia 1963, p. 1158.

The cellulose is applied in solution in suitable mixed solvents such as acetone/alcohol and may contain plasticisers such as castor oil.

When a satisfactory thickness of cellulose acetate phthalate has been applied the sugar coating procedure as outlined in Example 12 is followed.

EXAMPLE 14

Capsules

To prepare 10,000 capsules each containing 50 mg. 4-(2-hydroxyethyl)-benzophenone mix together 500 g. 4-(2-hydroxyethyl)-benzophenone finely powdered and 500 g. micro-crystalline cellulose. Fill the mixed powders into No. 4 hard gelatin capsules, each capsule containing 100 mg. of the mixture.

Although Examples 11 to 14 relate to the use of 4-(2-hydroxyethyl)-benzophenone as the active ingredient, any of the compounds described herein can, of course, be used in place thereof.

What is claimed is:
1. 4-(2-hydroxyethyl)-benzophenone.
2. 4-(2-hydroxypropyl)-benzophenone.
3. 3-(2-hydroxypropyl)-benzophenone.
4. $4^1$-methoxy-4-(2-hydroxyethyl)-benzophenone.
5. $4^1$-chloro-4-(2-hydroxyethyl)-benzophenone.
6. $2^1$-chloro-4-(2-hydroxyethyl)-benzophenone.
7. $2^1$-methyl-4-(2-hydroxyethyl)-benzophenone.
8. $4^1$-methyl-4-(2-hydroxyethyl)-benzophenone.
9. $3^1$-methoxy-4-(2-hydroxyethyl)-benzophenone.
10. $4^1$-fluoro-4-(2-hydroxyethyl)-benzophenone.
11. $4^1$-chloro-3-(2-hydroxyethyl)-benzophenone.
12. $2^1$-methyl-3-(2-hydroxyethyl)-benzophenone.
13. $4^1$-methyl-3-(2-hydroxyethyl)-benzophenone.
14. $2^1$-chloro-4-(2-hydroxypropyl)-benzophenone.
15. 4-(2-hydroxy-1,1-dimethylethyl)-benzophenone.
16. 4-(2-hydroxy-2,2-dimethylethyl)-benzophenone.
17. A process for the preparation of compounds of the formula

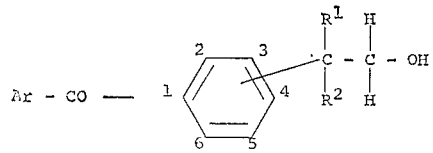

wherein $R^1$ and $R^2$ each represent a hydrogen atom or a straight or branched alkyl radical containing from 1 to 4 carbon atoms and Ar represents a phenyl ring or a phenyl ring substituted by one or more trifluoromethyl, hydroxy, methoxy or methyl radicals or by one or more halogen atoms, which comprises reducing with a complex metal hydride a ketal of the formula

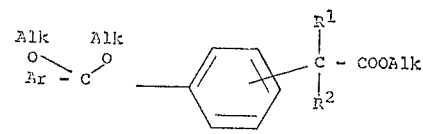

wherein $R^1$, $R^2$ and Ar are as defined above, and Alk represents an alkyl group; followed by subsequent hydrolysis of the ketal group.

References Cited

Lansbury et al., J. Am. Chem. Soc. 84, 1756–1757 (1962).

DANIEL D. HORWITZ, Primary Examiner

U.S. Cl. X.R.

260—488 CD, 665 R, 618 D, 469; 424—331